US008009331B2

(12) United States Patent
Suzuki

(10) Patent No.: US 8,009,331 B2
(45) Date of Patent: Aug. 30, 2011

(54) IMAGE FORMING APPARATUS

(75) Inventor: Nobuhiko Suzuki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1002 days.

(21) Appl. No.: 11/585,897

(22) Filed: Oct. 25, 2006

(65) Prior Publication Data

US 2007/0097393 A1 May 3, 2007

(30) Foreign Application Priority Data

Oct. 25, 2005 (JP) ................................ 2005-310186

(51) Int. Cl.
*H04N 1/21* (2006.01)
*G03G 15/00* (2006.01)

(52) U.S. Cl. ....................................... 358/296; 399/393

(58) Field of Classification Search .................. 358/296, 358/1.15, 1.16, 1.18, 401, 498, 444, 1.12, 358/403, 468, 451, 440, 474; 399/23, 391, 399/389, 370, 376, 393, 408, 107; 271/176, 271/298, 109, 264; 270/58.09, 58.19

See application file for complete search history.

(56) References Cited

U.S. PATENT DOCUMENTS

| | | | | |
|---|---|---|---|---|
| 6,198,548 | B1 * | 3/2001 | Yoshikawa et al. | 358/498 |
| 7,385,719 | B2 * | 6/2008 | Ohno et al. | 358/1.15 |
| 2004/0141762 | A1 * | 7/2004 | Okamoto et al. | 399/23 |

FOREIGN PATENT DOCUMENTS

| | | | |
|---|---|---|---|
| JP | 2001-341935 | A | 12/2001 |
| JP | 2002-173262 | A | 6/2002 |
| JP | 2003-118918 | A | 4/2003 |
| JP | 2003118928 | | 4/2003 |
| JP | 2003-244362 | A | 8/2003 |
| JP | 2003-327362 | A | 11/2003 |
| JP | 2004-338910 | A | 12/2004 |

OTHER PUBLICATIONS

Japan Patent Office; Notification of Reasons for Refusal in Japanese Patent Application No. 2005-310186 (counterpart to the above-captioned US Patent Application) mailed on Jul. 27, 2010.

Japan Patent Office, Notice of Reason for Refusal in Japanese Patent Application No. 2005-310186 (counterpart to the above-captioned US Patent Application) mailed on Mar. 1, 2011.

* cited by examiner

*Primary Examiner* — Saeid Ebrahimi Dehkordy
(74) *Attorney, Agent, or Firm* — Baker Botts L.L.P.

(57) ABSTRACT

An image forming apparatus comprises an inner discharge part which discharges a recording sheet on which an image has been formed, a size determining unit which determines whether or not a size of the recording sheet to be discharged in the inner discharge part is smaller than a predetermined size, and a notification unit which indicates that the size of the recording sheet is smaller than the predetermined size based on a determination by the size determining unit.

7 Claims, 7 Drawing Sheets

IMAGE FORMING APPARATUS

CROSS-REFERENCE TO RELATED APPLICATION

This application claims priority from Japanese Patent Application No. 2005-310186, filed on Oct. 25, 2005, the entire subject matter of which is incorporated herein by reference.

TECHNICAL FIELD

Aspects of the invention relate to an image forming apparatus which forms an image on a recording sheet.

BACKGROUND

In a related image forming apparatus, a recording sheet on which a desired image has been formed is discharged on a discharge tray provided on the left side or the right side outside an apparatus body. In case of this sheet discharge manner, it is necessary to secure, in addition to arrangement space for the apparatus body, arrangement space for the discharge tray. Therefore, recently, there is proposed an image forming apparatus of an inner discharge type, which discharges a recording sheet on which an image has been formed onto an inner discharge part provided in the apparatus body. In the inner discharge type image forming apparatus, since the upper portion of the inner discharge part is covered, a user cannot recognize visually a small-sized recording sheet unless a user does not look in the inner discharge part.

Therefore, for example, in an image forming apparatus disclosed in JP-A-2003-118918 (refer to paragraphs 0007 and 0014 to 0018, and FIGS. 1 and 5), a discharge tray provided between the lower surface of a reader and the upper surface of a printer is slanted so as to go down toward the downstream side in the sheet discharge direction. An abutment member is rotatably provided near the side surface on the downstream side in the sheet discharge direction of the discharge tray. The recording sheet is surely butted on the abutment member by increasing a transporting speed of a small-sized recording sheet or by changing a transporting path for small-sized recording sheet from a transporting path for large-sized recording sheet. According to the image forming apparatus disclosed in JP-A-2003-118918, the small-sized recording sheet slides down to the downstream side in the sheet discharge direction along the inclination of the discharge tray and is stopped by the abutment member, and the leading end portion of the recording sheet is aligned at the side surface on the downstream side in the sheet discharge direction of the discharge tray. Therefore, even if the user does not look in the discharge tray located between the reader and the printer, the user can readily recognize the small-sized recording sheet visually from the outside.

However, in the image forming apparatus disclosed in JP-A-2003-118918, when the recording sheet is to be taken out from the discharge tray, the abutment member must be rotated, which is troublesome. In case an image forming apparatus is configured such that the trailing end portion of the recording sheet is butted on the upstream side surface in the sheet discharge direction of the discharge tray to eliminate the abutment member, the user of the image forming apparatus does not notice the small-sized recording sheet placed in the inner part of the discharge tray, so that the small-sized recording sheets maybe accumulated on the discharge tray thereby to cause sheet transportation failure. Also, the user may forget to take out the small-sized recording sheet from the discharge tray.

Further, in the image forming apparatus disclosed in JP-A-2003-118918, the abutment member must be installed in the discharge tray. Alternatively, it is necessary to increase the transporting speed of the small-sized recording sheet or to change the transporting path of the small-sized recording sheet from that of the large-sized recording sheet in order to surely butt the small-sized recording sheet on the abutment member. Thus, the structure of the apparatus made complicated.

SUMMARY

Aspects of the invention provide an image forming apparatus which can prevent a user from forgetting to take out a small-sized recording sheet from an inner discharge part.

DETAILED DESCRIPTION

General Overview

Figure 1:
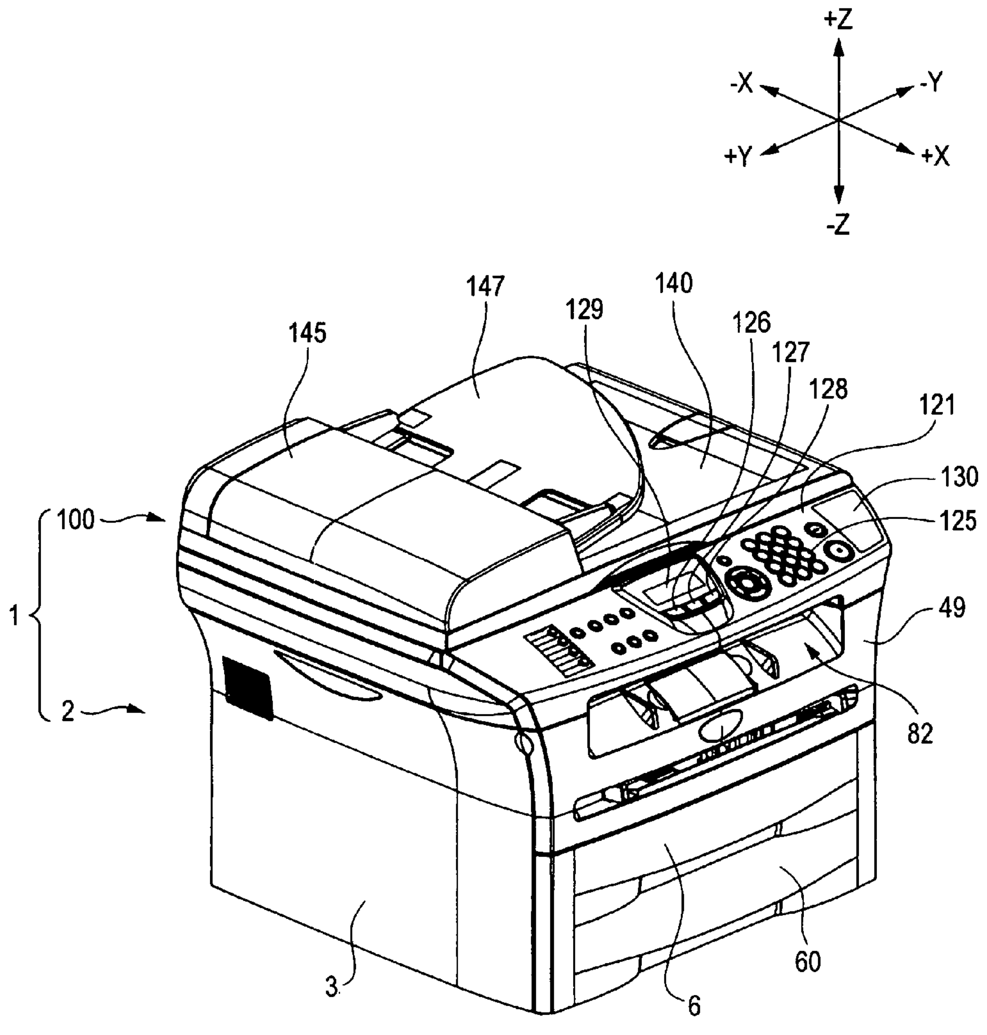
FIG. 1 is a perspective view of a multifunction device according to a first aspect of the invention.

According to an aspect of the invention, an image forming apparatus comprises: an inner discharge part which discharges a recording sheet on which an image has been formed; a size determining unit which determines whether or not a size of the recording sheet to be discharged in the inner discharge part is smaller than a predetermined size; and a notification unit which indicates that the size of the recording sheet is smaller than the predetermined size based on a determination by the size determining unit.

According to another aspect of the invention, the image forming apparatus is capable of receiving facsimile data and recording the facsimile data on the recording sheet, wherein the notification unit indicates only if the facsimile data is recorded on the recording sheet.

According to still another aspect of the invention, the image forming apparatus further comprises: a recording sheet detecting unit which detects whether or not the discharged recording sheet exists in the inner discharge part; and a notification stop unit which stops the indication by the notification unit if the recording sheet detecting unit has determined that the recording sheet does not exist in the inner discharge part.

According to still another aspect of the invention, the image forming apparatus further comprises a change unit which changes a content of the indication by the notification unit if a recording sheet having the predetermined size or more and a recording sheet having the smaller size than the predetermined size are discharged and stacked in the inner discharge part.

According to still another aspect of the invention, the notification unit provides a visual indication to notify that the size of the recording sheet is smaller than the predetermined size.

According to still another aspect of the invention, the notification unit provides an audio indication to notify that the size of the recording sheet is smaller than the predetermined size.

In the image forming apparatus having the above structure, when the small-sized recording sheet is discharged to the inner discharge part, the size determining unit determines whether the size of the recording sheet discharged in the inner discharge part is smaller than the predetermined size, and the notification unit informs the user of the image forming apparatus that the size of the recording sheet which is smaller than the predetermined size has been discharged to the inner discharge part. Therefore, even in case that the small-sized recording sheet discharged to the inner discharge part cannot be recognized visually from the outside, the user notices by the indication from the notification unit that the small-sized recording sheet is in the inner discharge part, and the user can remove the small-sized recording sheet from the inner discharge part. Therefore, according to the image forming apparatus, without complicating the structure of the transporting tray and the transporting structure of the recording sheet, by only providing the size determining unit and the notification unit, it is possible to prevent the user from forgetting to take out the recording sheet that is smaller than the predetermined size from the inner discharge part.

Further, since the notification unit gives the indication when the facsimile data is received and recorded on the recording sheet, even in case that the facsimile function is executed, and the recording sheet is discharged to the inner discharge part regardless of intention of the user using the image forming apparatus, the user can notice the existence of its recording sheet and can remove the recording sheet.

After the notification unit has given the indication, when the user using the image forming apparatus removes the recording sheet from the inner discharge part, and the recording sheet detecting unit detects the absence of the recording sheet in the inner discharge part, the notification stop unit stops the indication from the notification unit automatically. Therefore, the notification unit does not continue giving the indication after the recording sheet has been removed from the inner discharge part.

Further, when the recording sheet having the predetermined size or more and the recording sheet having the smaller size than the predetermined size are discharged in layers onto the inner discharge part, the change unit changes the indication contents by the notification unit. Hereby, the user is notified that the recording sheet which is smaller than the predetermined size is included in the recording sheets discharged to the inner discharge part, and it is possible to prevent the user from forgetting to take out the recording sheet which is smaller than the predetermined size.

Further, when the notification unit gives the visual indication such as on/off of an alarm lamp or display of message, the indication can be performed quietly.

<Illustrative Aspects>

Now, aspects of an image forming apparatus according to the invention will be described with reference to drawings.

(First Aspect)

FIG. 1 is a perspective view of a multifunction device 1 according to a first aspect of the invention.

In this aspect, an image forming apparatus is applied to the multifunction device 1. The multifunction device 1 includes an image forming unit 2 having a body casing 3 and an image reading unit 100 arranged on the upper side of the image forming unit 2. The multifunction device 1 has a facsimile function, a scanner function, a printer function, and a copy function. Further, this multifunction device 1 is an inner discharge type which will be described later in detail, in which a discharge tray (inner discharge part) 46 is provided between the both units 2 and 100. The multifunction device 1 informs, when a sheet (recording sheet) that is smaller than a predetermined size is discharged onto the discharge tray 46, an user of that fact.

In the following description, a depth direction of the multifunction device 1 is taken as an X-direction (the front side is taken as a +X-direction), a width direction thereof is taken as a Y-direction (a left side in FIG. 1 is taken as a +Y-direction), and a height direction thereof is taken as a Z-direction (an upper side in FIG. 1 is taken as a +Z-direction).

<Image Forming Unit>

Figure 2:
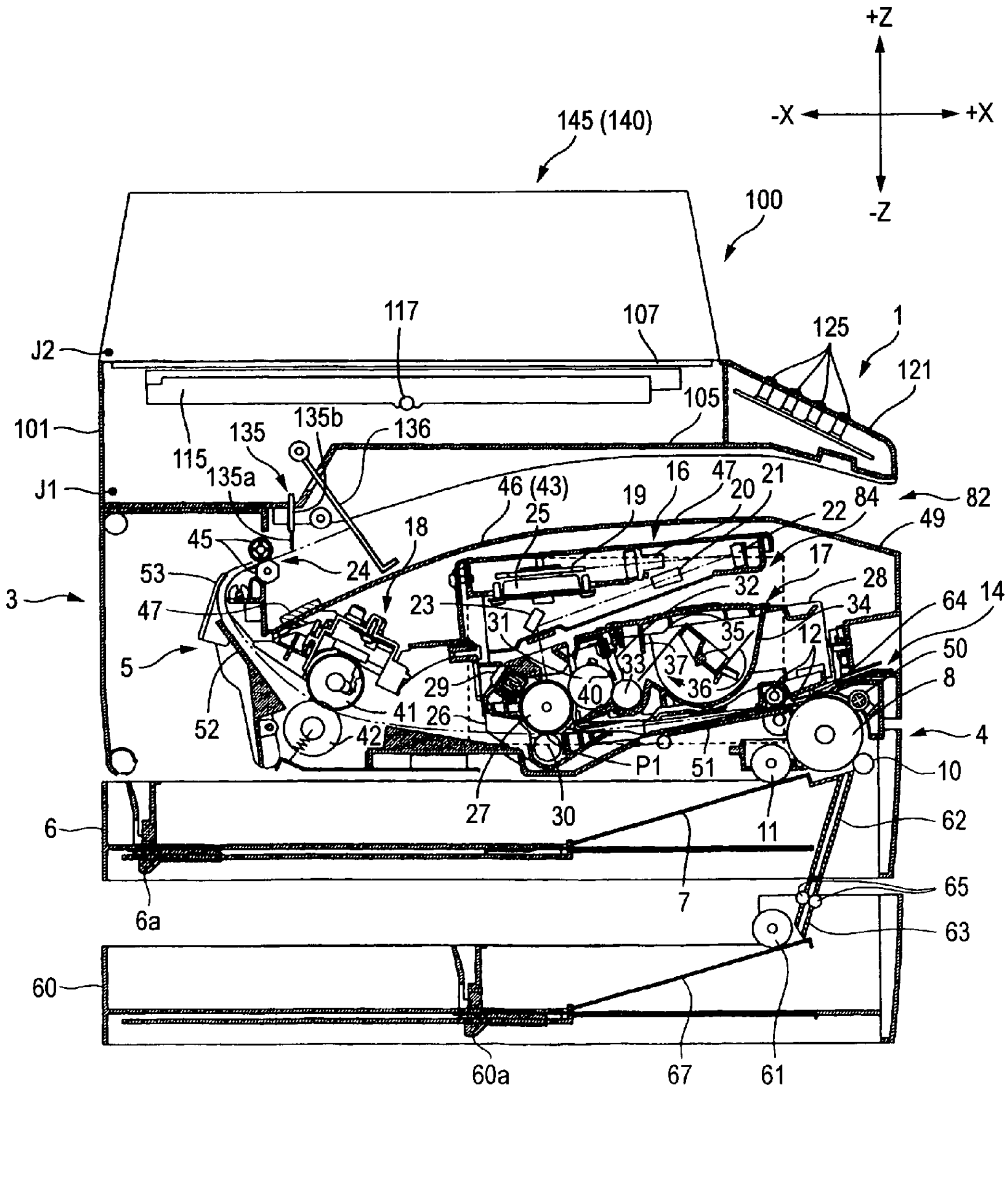
FIG. 2 is a vertical sectional view of the multifunction-device.

FIG. 2 is a vertical sectional view of the multifunction device 1.

The image forming unit 2 includes a feeder part 4 for sheet supply which is arranged on the bottom side of the body casing 3 and an image forming part 5 for forming an image which is arranged above the feeder part 4.

The feeder part 4 includes a main sheet supply cassette 6 and an option sheet supply cassette 60, which are formed in the shape of a thin tray, and arranged in an upper and lower two-layer state on the bottom side of the multifunction device 1. In the main sheet supply cassette 6 and the option sheet supply cassette 60, adjustment levers **6*a* and 60*a* are provided so that they can reciprocate linearly along a sheet transporting direction (in a direction of an X-axis in the figure), and the position of each adjusting lever 6*a*, 60*a*** is adjusted according to sheet size, whereby the sheets are housed in a state where ends of the accumulated sheets are aligned.

The feeder part 4 includes a feed roller 11, a supply roller 8, a pinch roller 10, and a register roller 12 on a front side of the main sheet supply cassette 6. The feeder part 4, after feeding sheets from the main sheet supply cassette 6 to the front side one by one, turns the sheet toward the rear back side of the body casing 3 and feeds the sheet to a transporting path (indicated by chain double-dashed lines in FIG. 2). The Most of the transporting path from the upper end of the supply roller 8 to an image forming position P1 is defined by a sheet guide member 51 formed on the body side of the multifunction device 1 and the bottom part of a process unit 17.

The main sheet supply cassette 6 has a sheet press plate 7. The sheet press plate 7 is cantilevered relative to the main sheet supply cassette 6, and its end near the supply roller 8 is swingable in the up-and-down direction. This sheet press plate 7 is provided with a spring (not shown), and urged upward so that the upper surface of the leading end of the sheet placed on the main sheet supply cassette 6 is brought into a contact with the feed roller 11.

To the lower portion of the supply roller 8, a separation pad (not shown) is provided to be urged toward the supply roller 8 by a spring (not shown), which prevents the plural sheets from being transported in the transporting path in a layer state. Namely, when the sheet fed out by the feed roller 11 comes into contact with the supply roller 8 and the separation pad (not shown). A proper friction force is applied between the separation pad and the sheet. Thus, even in case that the feed roller 11 feeds plural sheets to the separation pad, the separation pad stops other sheets than the sheet located in the uppermost position. Therefore, the sheets are supplied from the supply roller 8 one by one. Further, a reference numeral 50 is a paper dust removal roller, which removes paper dust of the supplied sheet.

Further, the feeder part 4 includes a feed roller 61 and supply rollers 65, 65 on the front side of the option sheet supply cassette 60. The feed roller 61 is rotatably attached to the option sheet supply cassette 60 so as to extend orthogonally to the sheet transporting direction and is driven by a motor (not shown). The feed roller 61 feeds sheets from the option sheet supply cassette 60 one by one. On the front side of the feed roller 61, guide members 62, 63 are arranged upright so as to stride between the feed roller 61 and the supply roller 8. The guide members 62 and 63, in order to prevent them from being a hindrance when the main sheet supply cassette 6 or the option sheet supply cassette 60 is pulled out on the front side, are provided so as to separate from each other between the main sheet supply cassette 62 and the option sheet cassette 63. On the guide member 62, a pair of supply rollers 65, 65 are rotatably arranged and driven by a motor (not shown).

The sheet housed in the option sheet supply cassette 60, when it is fed out by the feed roller 61 to the supply rollers 65, 65 and passes through the guide members 63, 62, is guided between the supply roller 8 and the pinch roller 10, and thereafter transported in the same transporting path (indicated by chain double-dashed lines in FIG. 2) as that of the sheet in the main sheet supply cassette 6. In the option sheet supply cassette 60, a sheet press plate 67 is supported in a swingable manner and brings the sheet into contact with the feed roller 61. The structure of the sheet press plate 67 is similar to that of the sheet press plate 7.

The register roller 12 is composed of a pair of rollers, and its drive and stop operations are controlled on the basis of detection timing by a position sensor 64 arranged near the supply roller 8 by a controller 200 described later which is arranged in a base board (not shown). By this control, sheet skew is corrected. Namely, the later-described controller 200 puts, when the supply roller 8 transports the sheet, the register roller 12 in a driving state, and stops the register roller 12 when the position sensor 64 detects the leading end of the sheet. Thereafter, when the sheet comes into contact with register roller 12 and is put in a warp state, the controller 200 drives the register roller 12 again and transports the sheet to the image forming part 5.

The position sensor 64 is a mechanical type, which is constructed such that when the sheet presses the position sensor 64, a part of the position sensor 66 moves from the predetermined position. Further, a little above the supply roller 8, a manual sheet supply port 14 for directly supplying sheet from the front side of the multifunction device 1 to the position of the register roller 12 is formed, whereby the sheet can be supplied in the transporting path.

The image forming part 5 includes a scanner part 6, a process unit 17, and a fixing unit 18.

The scanner 16 is provided above the process unit 17 described later in the body casing 3. The scanner 16 includes a laser emission part (not shown), a polygon mirror 19 which is rotation-driven by a polygon motor 25, lenses 20 and 21, and reflection mirrors 22 and 23. The scanner 16 causes a laser beam emitted from the laser emission part to pass through or reflect the polygon mirror 19, the lens 20, the reflection mirror 22, the lens 21, and the reflection mirror 23 in this order, and applies the laser beam through a path indicated by chain lines in FIG. 2 onto a surface of a photosensitive drum 27 in the process unit 17 by high-speed scanning.

The process unit 17 has a drum cartridge 26 and a development cartridge 28. On the front side of the body casing 3, a front cover 49 is held turnably. Therefore, when the front cover 49 is turned in an open direction and set in a horizontal position, the process unit 17 can be detached from the front side (+X side) of the multifunction device 1.

As shown in FIG. 2, the drum cartridge 26 of the process unit 17 includes the photosensitive drum 27, a scorotron type charger 29, and a transfer roller 30. On the other hand, the development cartridge 28 includes a development roller 31, a toner box 34 and the like, and is detachably attached to the drum cartridge 26.

In the toner box 34, toner (developer) is filled. The toner in the toner box 34 is agitated by rotation in a direction of an arrow (by clockwise rotation) of an agitator 36 supported by a rotary shaft 35 provided in the center of the toner box 34, and discharged from a toner supply port 37 provided for the toner box 34.

In a side position (a position on a rear surface side) of the toner supply port 37, a toner supply roller 33 is provided rotatably counterclockwise, and the development roller 31 is provided rotatably counterclockwise, opposed to this toner supply roller 33. These toner supply roller 33 and development roller 31 are brought into contact with each other in a state where they compress each other in some degree.

Further, near the development roller 31, a thickness regulating blade 32 is provided. This thickness regulating blade 32 has, at a leading end of a blade body formed of a metallic leaf spring, a press part 40 which is formed of insulating silicon rubber and has a semicircular section. The thickness regulating blade 32 is supported by the development cartridge 28 near the development roller 31 and constructed such that the press part 10 is brought into pressure contact on the development roller 31 by elastic force of the blade body.

The toner discharged from the toner supply port 37 is supplied to the development roller 31 by rotation of the toner supply roller 33, and at this time, is friction-charged positively between the toner supply roller 33 and the development roller 31. Further, the toner supplied onto the development roller 31 goes between the press part 40 of the thickness regulating blade 32 and the development roller 31 with rotation of the development roller 31, is more sufficiently friction-charged here, and carried on the development roller 31 as a thin layer having a predetermined thickness.

The photosensitive drum 27, in a side position of the development roller 31, is provided in a clockwise rotatable manner in an opposed state to the development roller 31. The surface of the photosensitive drum 27 is a photosensitive layer which is formed of polycarbonate. A drum body is grounded, and a drum surface portion is positively charged. This photosensitive drum 27 is rotatably driven by power from a main motor (not shown)

The scorotron type charger 29 is provided with a predetermined space from the photosensitive drum 27 so as not to come into contact with the photosensitive drum 27. This scorotron type charger 29 is arranged, in a radius direction of the photosensitive 27, about 30 degrees above the horizontal direction. Further, the this scorotron type charger 29 is a scorotron type charger for positive charge which generates corona discharge from a charging wire such as tungsten, and is constructed so as to charge the surface of the photosensitive drum 27 uniformly with positive polarity.

The surface of the photosensitive drum 27, with rotation of its photosensitive drum 27, is positively charged by the scorotron charger 29 uniformly and thereafter exposed to light by high-speed scanning of the laser beam from the scanner 16, so that an electrostatic latent image is formed on the photosensitive drum 27 on the basis of the predetermined image data.

By the rotation of the development roller 31, the toner carried on the development roller 31 and positively charged, when it comes into contact with the photosensitive drum 27 in an opposed state, is supplied to the electrostatic latent image formed on the surface of the photosensitive drum 27. That is, the toner is supplied to the exposure portion which is exposed to the light by the laser beam and becomes low in electric potential of the surface of the photosensitive drum 27 being positively charged uniformly. Thus, the toner is selectively carried on the surface of the photosensitive drum 27 and makes the latent image visible, whereby reversal development is achieved.

The transfer roller 30 is arranged below the photosensitive drum 27 so as to be opposed to this photosensitive drum 27 and is supported by the drum cartridge 26 in a counterclockwise rotatable manner. This transfer roller 30 is formed by covering a metallic roller shaft with a roller formed of ion-electroconductive rubber material and receives transfer bias (transfer forward bias) in the transfer time. Therefore, the visible image carried on the surface of the photosensitive drum 27, while the sheet passes between the photosensitive drum 27 and the transfer roller 30 (in an image forming position P1), is transferred onto the sheet.

On the sheet transporting direction downstream side (inner side) of the process unit 17, a fixing unit 18 including a fixing unit roller 41 and a pressure roller 42 is provided. The fixing unit roller 41 includes a metal pipe of which a surface is coated with fluorocarbon resin and a heating halogen lamp in its metal pipe and is rotation-driven by input of power from a motor (not shown).

The pressure roller 42 is arranged oppositely below the fixing unit roller 41 so as to press the fixing unit roller 41. This pressure roller 42 is formed by covering a metallic roller shaft with a roller formed of rubber material, and driven in accordance with rotation-drive of the fixing unit roller 41.

In the fixing unit 18, the toner transferred onto the sheet in the transfer position is heat-fixed while the sheet passes between the fixing unit roller 41 and the pressure roller 42. The sheet onto which the toner has been fixed is transported to a discharge path (formed by sheet guide members 52, 53) extending toward the upper surface of the body casing 32. The sheet transported in the discharge path is turned again by a discharge roller 45 provided above, and discharged from a sheet discharge 24 onto a depressed discharge tray 46 provided in a central portion of an upper surface wall 43 of the body casing 3 (refer to FIG. 2).

Regarding the shape of the discharge tray 46, its upper surface is a little larger than A4-size of plain sheet, and its front end portion of the tray descends slightly while its upper surface curves gently from a rear wall 1*a* of the multifunction device 1 toward the front side thereof (from −X side to +X side). Further, a sheet take-out port 82 is formed between the discharge tray 46 and a lower surface wall 105 of an image reading unit 100 described next. Hereby, when an image has been formed on A4-sized sheet, the sheet after the image formation is discharged on the discharge tray 46 in a manner in which the leading end portion of the sheet protrudes from the sheet take-out port 82. Hereby, the user can take out the sheet after image formation readily from the sheet take-out port 82 without turning the image reading unit 100 in the open direction.

On the other hand, the sheet below the A4 size, since the end portion of the discharge port 24 side (−X side in the figure) of the discharge tray 46 inclines downward, when it is discharged from the discharge part 24 onto the discharge tray 46, slides down to the discharge port 24 side along the inclination of the discharge tray 46, and is butted on the inner wall of the body casing 3 with the trailing end portion of the sheet aligned. Therefore, the sheet below the A4 size, since its leading end portion does not protrude from the sheet take-out port 82, is difficult to be recognized visually from the sheet take-out port 82. Therefore, a sheet discharge sensor 47 is attached on the end upper surface on the discharge part 24 side of the discharge tray 46, thereby to detect the sheet discharged onto the discharge tray 46. The sheet discharge sensor 47 may be a contact type sensor such as a limit switch or a piezoelectric element, or may be a non-contact type optical sensor such as an optical sensor.

The sheet discharged onto the discharge tray 46 is pressed downward (in the −z direction in the figure) by a press lever 136 held swingably by the image reading unit 100 described later, whereby it is prevented that the sheet discharge part 24 is stopped up by coming-up of the sheet end portion.

<Image Reading Unit>

The image reading unit 100 is a flatbed type, and includes an upper casing 101 which can cover the upper surface of the discharge tray 46. This upper casing 101 has the shape of a box which opens upward, and includes an image sensor 115 therein. The upper surface of the image sensor 115 is covered with a platen glass 107 for placing an original document thereon. The image sensor 115 is a line-type sensor extending in the X-axis direction in FIG. 2, which is supported by a guide shaft 117, and can advance and retreat in a direction orthogonal to the sheet surface (in the Y-axis direction) along the guide shaft 117.

This image sensor 115 has plural photodiodes (not shown) installed in a row in the extending direction, and so constructed as to receive the reflection light when strong light from a not-shown light source strikes the original document at the respective photodiodes and convert intensity (lightness) of the reflection light for each pixel into an electric signal. The image reading unit 100 converts this electric signal into digital data by a not-shown A/D converter, whereby the image formed on the original document can be read as image data. Further, in a position near the rear end (end on the back surface side) of a lower wall 105 of the upper casing 101, a static eliminator brush 135 is provided. The static eliminator brush 135 is composed of a holder part 135*b* and a brush part 135*a* held by this holder part 135*b*, and is so constructed that the brush part 135*a* comes close to or into contact with the sheet throughout the entire width of the sheet when the sheet is discharged. On the front side of the static eliminator brush 135, the press lever 136 is disposed. The press lever 136 is energized by a not-shown spring counterclockwise in the figure thereby to press the sheet in the down direction (−Z direction in the figure), and the press levers 136 are provided in plural locations in the full width direction of the sheet with regular spaces.

On the other, as shown in FIG. 1, on the upper surface of the image reading unit 100, on the front side (+X side) there is disposed an operational panel 121 including an operational touch panel 125, a COPY mode key 126 for switching to a copy functions, a FAX mode key 127 for switching to a facsimile function, a PEINT mode key 128 for outputting a recording sheet upon reception of a print command from an external apparatus such as a personal computer, a liquid crystal panel 129, and a speaker 130, and the like A document cover 140 having an ADF mechanism 145 is arranged in line with this operational panel 121. The COPY mode key 126, the FAX mode key 127, and the PEINT mode key 128 include respectively a light emission diode therein, and a controller 200 described later controls their light emission states.

Figure 3:
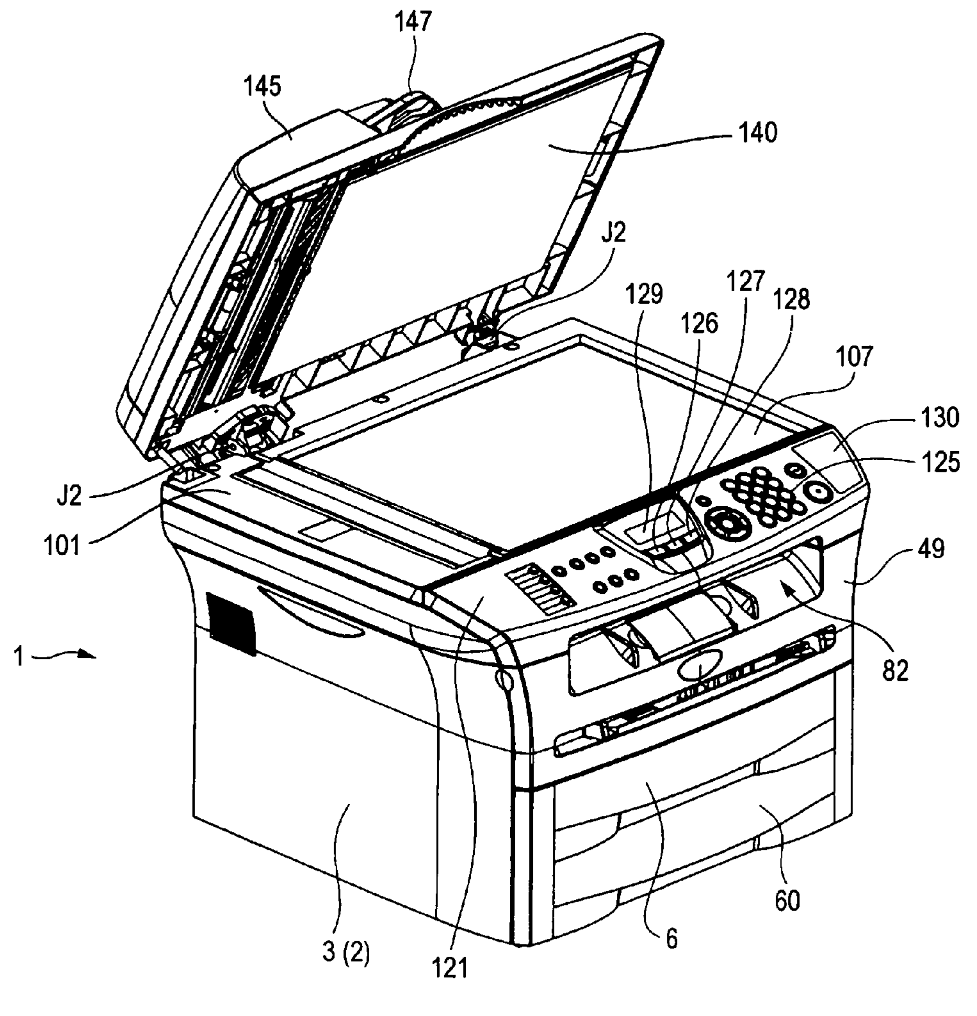
FIG. 3 is a perspective view showing the multifunction device in a state where a document cover is opened.

FIG. 3 is a perspective view showing the multifunction device 1 in a state where the document cover 140 is opened.

The document cover 140 is formed with a size which can cover the upper surface of the platen glass 107, and is rotatably coupled to the upper casing 101 through a second hinge axis J2 provided in a position near the back on the upper surface of the upper casing 101.

Hereby, the document cover 140 is always in a posture in which the document cover 140 covers the upside of the platen glass 107. However, when an original document is set, the document cover 140 can be rotated around the second hinge axis J2 by the operation at the front side (+X side), whereby the platen glass 107 can be exposed. Further, though the detailed description of the ADF mechanism 145 is omitted, the ADF mechanism 145 takes the documents from a document supply tray 147 one by one without moving the image sensor 115 and causes the documents to pass through the upside of the image sensor 115 thereby to read an image from the document.

<Coupling Structure of Both Units>

Figure 4:
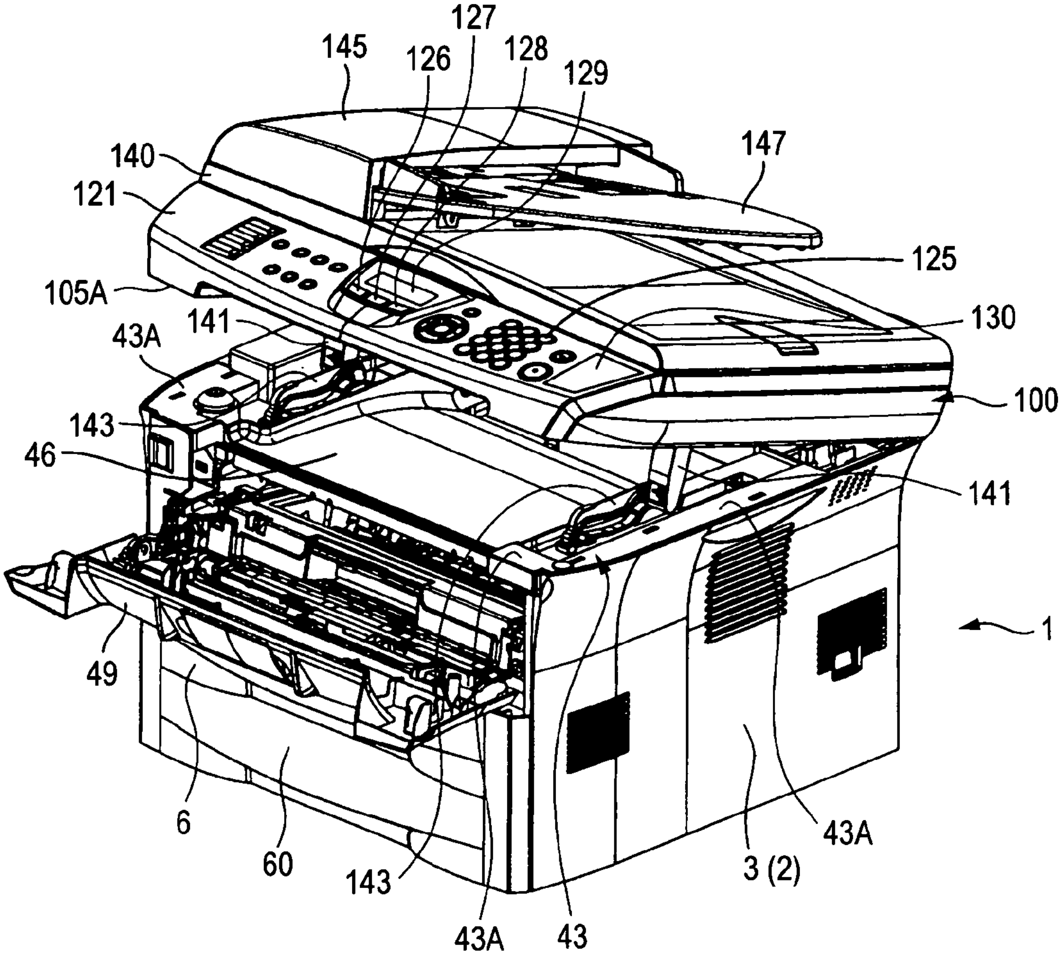
FIG. 4 is a perspective view showing the multifunction device in a state where an image reading unit is in an open position.

FIG. 4 is a perspective view showing the multifunction device 1 in a state where the image reading unit 100 is in an open position. The above-mentioned image reading unit 100 is coupled to the image forming unit 2 rotatably by hinge axes (hereinafter taken as a first hinge pivot J1) J1 (refer to FIG. 2) provided at left and right ends of the rear wall 1*a* of the multifunction device 1. Between the image forming unit 2 and the image reading unit 100, a pair of guide members 141, 141 are provided. In the guide member 141, its upper end is coupled to the upper casing 101 rotatably, and its lower end engages with a rail groove of a rail member 143 fixed to a convex edge portion 43A of the body casing 2. Therefore, when the guide member 141 is in a sideways posture, the image reading unit 100 comes into contact with the image forming unit 2 so as to cover the discharge tray 46 and is held in a close position. When the guide member 141 changes from the sideways posture to a upright posture, the image reading unit 100 is guided by the guide member 141 thereby to rotate in relation to the image forming unit 2, and moves from the close position to the open position.

<Control System of Multifunction Device>

Figure 5:
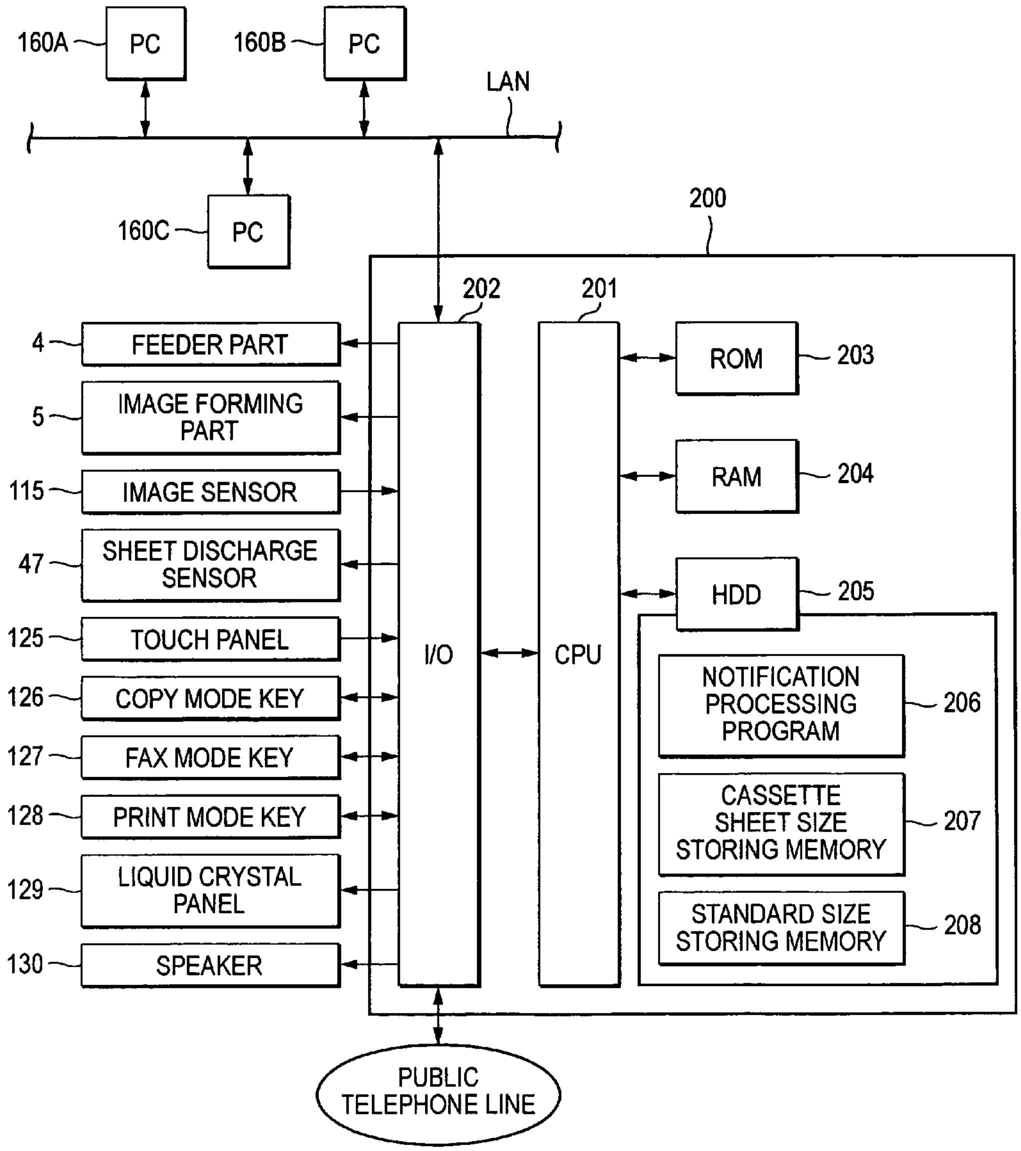
FIG. 5 is a control block diagram of the multifunction device shown in FIG. 1.

FIG. 5 is a control block diagram of the multifunction device 1 shown in FIG. 1.

A controller 200 is a known computer, which is built in the multifunction device 1, and controls the operation of the multifunction device 1 such as sheet supply timing in which the sheet is supplied from the feeder part 4 to the image forming part 5 and image forming timing in which an image is formed in the image forming part 5. To the controller 200, plural personal computers (hereinafter shortly written as "PC") 160A, 160B, 160C . . . are connected through a connection cable LAN, and can use the multifunction device 1 as a printer in common. In this aspect, although the plural personal computers PC 160A, 160B, 160C . . . are connected through the connection cable LAN to the multifunction device 1, one PC may be connected through a dedicated cable to the multifunction device 1, or the PC does not need to be connected to the multifunction device 1 according to circumstances. Further, to the multifunction device 1, a public telephone line connects, whereby facsimile data can be transmitted and received.

The controller 200 is constructed centered with respect to a central processing unit (hereinafter shortly written as "CPU") 201. To the CPU 201, an input/output interface 202, ROM 203, RAM 204, a hard disc drive (hereinafter shortly written as "HDD" 205), and the like are connected.

The CPU 201 performs data processing or calculation, and manages the operation of the multifunction device 1.

The input/output interface 202 gives and receives data between a device provided outside the controller 200 and the interface 202. In this aspect, to the input/output interface 202, the feeder part 4, the image forming part 5, the image sensor 115, and the touch panel 125 are connected, whereby signals necessary to control the image forming operation are input and output. Further, to the input/output interface 202, the sheet discharge sensor 47 is connected, and a detection signal for detecting the presence and absence of the sheet discharged onto the discharge tray 46 is inputted. Further, to the input/output interface 202, the COPY mode key 126, the FAX mode key 127, and the PRINT mode key 128 are connected, and a signal for selecting the function executed by pushing on each mode key 126, 127, 128 is inputted, and a signal for lighting the mode key 126, 127, 128 corresponding to the selected function is outputted. Further, to the input/output interface 202, the liquid crystal panel 129 is connected, and a signal for displaying a message is outputted. Further, to the input/output interface 202, the speaker 130 is connected, and a signal for controlling alarm sound or voice of alarm announce is outputted.

The ROM 203 is a nonvolatile memory for storing various programs or data.

The RAM 204 is a volatile memory for storing various programs or data.

The HDD 205 is a nonvolatile memory which can store various programs or data and read/write them. In the HDD 205, for example, an indication processing program 206, a cassette sheet size storing memory 207, a standard size storing memory 208 are stored.

In place of the HDD 205, EEPROM may be used, and the indication processing program 206 may be stored in the ROM 203.

The indication processing program 206 determines whether or not the size of the sheet discharged onto the discharge tray 46 is a small size. The indication processing program 206, when it determines that the size of the sheet discharged onto the discharge tray 46 is the small size, informs a user of its fact. When the sheet size is smaller than the standard size (predetermined size), its sheet size is determined to be the small size.

The cassette sheet size storing memory 207 records size of the sheet set in the main sheet supply cassette 6, size of the sheet set in the option sheet supply cassette 60, and size of the sheet set in the manual sheet supply port 14. The size of the sheet set in the main sheet supply cassette 6, the option sheet supply cassette 60, and the manual sheet supply port 14 can be arbitrarily set and changed by the touch panel 125*a* or a not-shown adjustment dial. In this aspect, setting of A4-sized plain sheet (hereinafter referred to as "A4 sheet") in the main sheet supply cassette 6, and setting of B5-size plain sheet (hereinafter referred to as "B5 sheet") in the option sheet supply cassette 60 are stored in the cassette sheet size storing memory 207.

The standard size storing memory 208 stores standard size which becomes a base value when the program determines whether or not the sheet size is the small size. The standard size may be a value set initially in the multifunction device 1 or a value set arbitrarily by means of the touch panel 125. In this aspect, A4 size of the plain sheet is set as the standard size.

<Indication Processing of Image Reading Unit>

Figure 6:
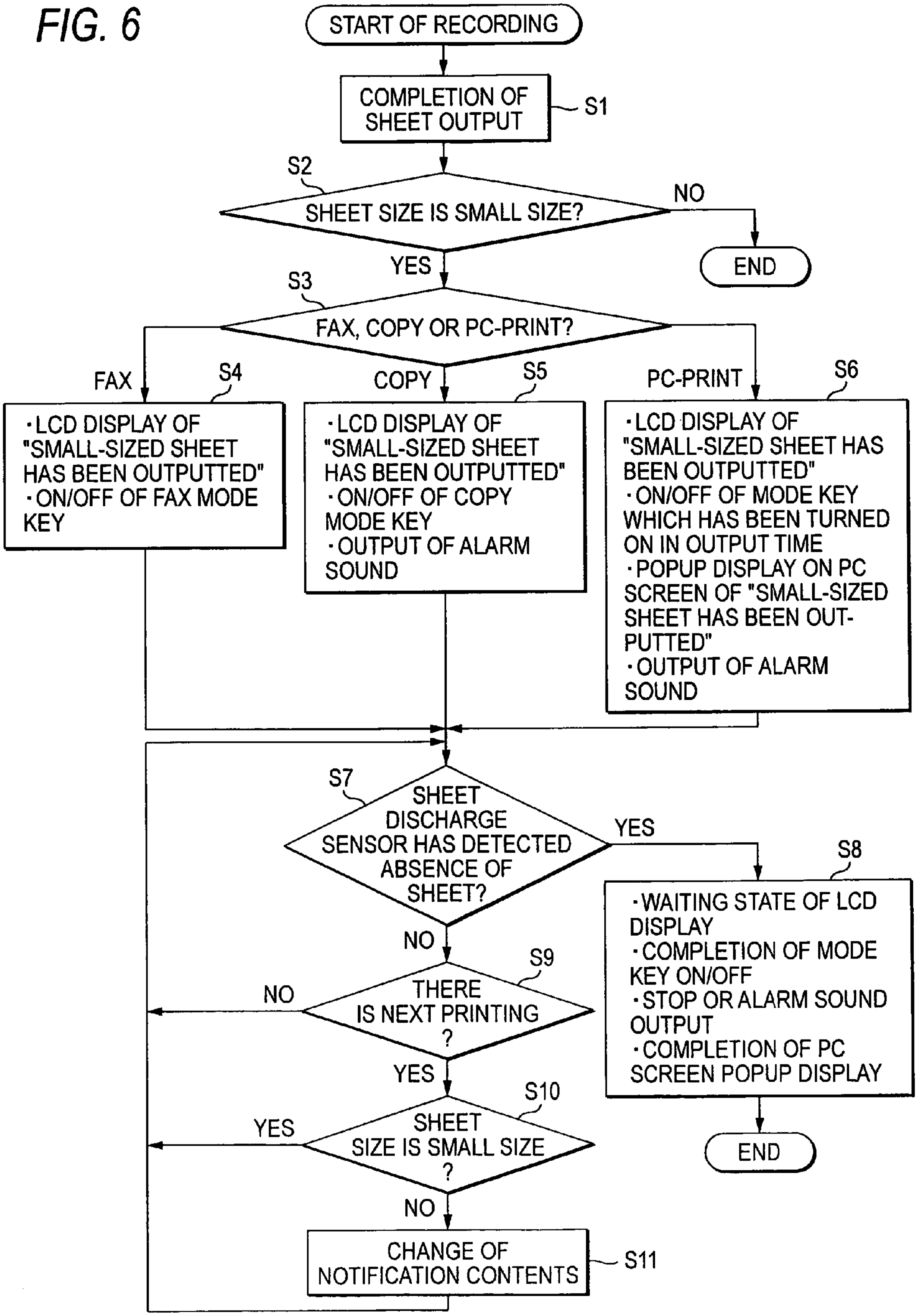
FIG. 6 is a flowchart showing indication process of the multifunction device shown in FIG. 1.

FIG. 6 shows a flowchart showing the indication processing by the multifunction device 1 shown in FIG. 1.

The multifunction device 1 inputs facsimile data, print data and copy data and reads out and executes the indication processing program 206 from the HDD 205 for each job recording each data on sheet. Here, as an example, a case where the multifunction device 1, after printing copy data on A4 sheet, receives facsimile data, records the facsimile data on B5 sheet and thereafter prints print data on A4 sheet on the basis of a print command from the PC 160C will be described.

Firstly, a case where copy data is printed on A4 sheet will be described.

A user of the multifunction device 1, after pushing on the COPY mode key 126, specifies A4 size in the touch panel 125 thereby to read an original document in the image reading unit 100, and pushes on a start button to start the copy operation. Then, the multifunction device 1 picks up A4 sheet from the main sheet supply cassette 6, prints the copy data, and discharges the sheet on which copy processing has been performed onto the discharge tray 46. At this time, the multifunction device 1, with the time when the start button is pushed on as a trigger, reads out the indication processing program 206 from the HDD 205 of the controller 200 and executes its program.

Namely, in a step 1 (hereinafter shortly written as "S1"), when copying is completed and the copied sheet completes to be discharged, whether the sheet outputted onto the discharge tray 46 is small size or not is determined in S2. The size of the sheet outputted onto the discharge tray 46 is recognized on the basis of selection of the sheet supply cassette 6, 60 or sheet size included in the facsimile data. Further, whether the sheet outputted onto the discharge tray 46 is small size or not is determined by comparison of the recognized sheet size with the standard size stored in the standard size storing memory 208, and its comparison result of whether the recognized sheet size is smaller than the standard size.

At this time, since the user selects the main sheet supply cassette 6 in the copying time and sets A4 sheet, the multifunction device 1 recognizes that the A4 sheet is discharged onto the discharge tray 46 and compares the A4 size with the standard size. As described above, in this aspect, since the A4 size of the plain sheet is set as the standard size, the multifunction device 1 determines that the size of the sheet discharged onto the discharge tray 46 is the same as the standard size and not the small size (S2: NO). In this case, the A4 sheet on the discharge tray 46, since its leading end protrudes from the sheet take-out port 82, can be recognized visually. In result, since it is thought that the user does not forget to take out the sheet, the indication processing ends as it is.

Here, the determination of the above S2 is performed for each sheet included in one job. The multifunction device 1, for example, when it is printing copy data on the A4 sheet, in case that the main sheet supply cassette 6 runs short of sheet, may switch the main sheet supply cassette 6 into the option sheet supply cassette 60 thereby to print the size-reduced copy data on the B5 sheet. In this case, the multifunction device 1 recognizes by the switching operation of the sheet supply cassette that the size of the sheet to be discharged onto the discharge tray 46 has become small than the standard size (A4 size) (S2: YES), and proceeds to S3. Processing from S3 on will be described later.

Next, a case where facsimile data is recorded on B5 sheet will be described.

The multifunction device 1, upon reception of facsimile data from the public telephone line, selects the sheet supply cassette on the basis of the sheet size included in the facsimile data. Here, since a transmitter of the facsimile data requires recording the facsimile data on B5 sheet, the multifunction device 1 selects the option sheet supply cassette 60. Next, the multifunction device 1 picks up B5 sheet from the option sheet supply cassette 60 to record the facsimile data and discharges the sheet on which the data has been recorded onto the discharge tray 46. The multifunction device 1, with reception of the facsimile data as a trigger, reads out the indication processing program 206 from the HDD 205 of the controller 200 and executes its program.

In S1 of FIG. 6, when the multifunction device 1 completes to output the B5 sheet, it determines in S2 whether or not the sheet size is the small size. As described above, in this aspect, the standard size is set to the A4 size of the plain sheet, and the B5 sheet size is smaller than the A4 size of the plain sheet. Therefore, the multifunction device 1 determines that the size of the sheet discharged onto the discharge tray 46 is the small size (S2: YES), and proceeds to S3. This is because there is fear that the B5 sheet discharged onto the discharge tray 46, since its leading end cannot be recognized visually from the sheet take-out port 82, cannot be recognized by the user of the multifunction device 1 from the outside. Further, the sheet supply cassette may be set according to the function so that the main sheet supply cassette 6 is used in copying mode and the option sheet supply cassette 60 is used in fax mode. In this case, cassette setting information is memorized in the HDD 205, the cassette is selected on the basis of its setting information, and recording is performed. Further, in this case, for example, when the B5 sheet is set in the option sheet supply cassette 60, even in case that the transmitter is the A4 sheet, the data is size-reduced and stored on the B5 sheet in the option sheet supply cassette 60.

In S3, which mode of the COPY mode, the FAX mode, and the PRINT mode is selected is determined. The reason of the mode determination is that: since attentions which the user pays to the multifunction device 1 are different among the copy function, the facsimile function, and the printer function, indication contents are made different among them.

Namely, indication content of displaying a message of "Small-sized sheet has been outputted." in the liquid crystal panel 129, and indication content of causing the COPY mode key 126, the FAX mode key 127, or the PRINT mode key 128 to emit on-and-off light are visual indication, and their visual indication, even if they are left as they is, do not give the surroundings any trouble, so that they are applied also to the indication contents in any mode.

On the other hand, aural indication contents of outputting an alarm sound or announce from the speaker 130, in case that they are left as they are, have fear of becoming noise. When the COPY mode or the PRINT mode is selected, since the image formation is performed on the basis of user's intention, the user can take out the sheet from the discharge tray 46 as soon as the alarm sound is outputted to stop the alarm sound. However, when the FAX mode is selected, since the image formation is performed regardless of the user's intention, in case that the facsimile data is received during his absence and the image formation is performed on the small-sized sheet, there is fear that the alarm sound continues to be outputted thereby to cause noise. Therefore, the output of the alarm sound is applied to only the indication contents in the COPY mode and the PRINT mode, and is not applied to the indication content in the FAX mode.

Further, for example, in case that the plural personal computers PC 160A, 160B, 160C . . . are connected to one multifunction device 1, the user of the PC which is set in a position apart from the multifunction device 1 must trouble to go to the setting place of the multifunction device 1, and must confirm whether or not the small-sized sheet has been outputted onto the discharge tray 46, which is bad in efficiency. Usually, after outputting a print command, it is thought that the PC user does not separate from the PC immediately. Therefore, to the PRINT mode, indication content of pop-up displaying a message of "Small-sized sheet has been outputted." on a PC screen is applied.

In case that the facsimile data is recorded on the B5 sheet (S3:FAX), a message of "Small-sized sheet has been outputted." is displayed on the liquid crystal panel 129 in S4, and the FAX mode key 127 is caused to emit the on-and-off light. Hereby, even in case that the facsimile data is recorded on the B5 sheet during the absence of the user of the multifunction device 1, and the B5 sheet cannot be recognized visually from the sheet take-out port 82, the user who has come back from the outside looks at the message on the liquid crystal panel 129 and on-and-off light emission of the FAX mode key 127, and can notice that the small-sized sheet is outputted onto the discharge tray 46.

Next, in S7, the multifunction device 1 determines whether or not the sheet discharge sensor 47 has detected that the sheet does not exist on the discharge tray 46. In case that the user of the multifunction device 1 has removed the sheet on the discharge tray 46, the sheet discharge sensor 47 detects that the sheet does not exist on the discharge tray (S7: YES). Therefore, in S8, the message on the liquid crystal panel 129 is deleted to make a standby condition, the FAX mode key 127 is turned off, and the indication is stopped. Hereby, by only taking-out the sheet from the discharge tray 46 by the user, the multifunction device 1 can be automatically returned to the state before the indication is given.

On the other hand, in case that the user of the multifunction device 1 does not remove the B5 sheet from the discharge tray 46, the sheet discharge sensor 47 does not determine that the sheet does not exist on the discharge tray 46 (S7: NO), the multifunction device 1 determines in S9 whether or not next printing exist. In a state where the user of the multifunction device 1 does not remove the B5 sheet from the discharge tray 46, till the multifunction device 1 receives the next print command, facsimile data, or copy data, the multifunction device 1 determines that the next printing does not exist (S9: NO), and waits in a state where the indication contents in S4 are continued. This is because necessity of indication is not eliminated.

Thereafter, in the state where the B5 sheet is not removed from the discharge tray 46, for example, when the multifunction device 1 receives a print command from the PC 160C and prints print data on A4 sheet, the multifunction device 1 determines that next printing exists (S9: YES), and determines in S10 whether or not sheet size is the small size. Since the determination in S10 is similar to that in S2, its detailed description is omitted. Since the print command received from the PC 160C is that print data is to be printed on A4 sheet, the multifunction device 1 picks up the A4 sheet from the main sheet supply cassette 6, prints the print data thereon and discharges on the B5 sheet the sheet on which printing has been completed. Since the A4 size of the plain sheet is the same as the standard size in this aspect, the multifunction device determines that the A4 size is not the small size (S10: NO) and proceeds to S11.

Next, in S11, the indication contents are changed. For example, the message displayed on the liquid crystal panel 129 is changed to a message of "Small-sized sheet is included" or on-off color and on-off interval of the FAX mode key 127 are changed. In case that the indication contents are not changed, the B5 sheet is covered with the A4 sheet, and there is fear that the user of the multifunction device 1 misjudges that the indication is wrong. Thereafter, the multifunction device 1 returns to S7 and performs processing from the above S7 on.

Since the indication processing is described here taking the case where the facsimile function is executed as an example, the alarm sound is not included in the change of the indication contents. However, in case that printing is performed on the small-sized sheet in execution of the copy function or the printer function, the alarm sound in addition to the display may be changed.

Further, in case that the next print command indicates, for example, printing on B5 sheet (S10: YES), the multifunction device 1 returns to S7 without changing the indication contents, because fear that the user of the multifunction device 1 misjudges that the indication is wrong is low.

Accordingly, when the B5 sheet is discharged onto the discharge tray 46, the multifunction device 1 in this aspect determines that the size of the sheet discharged onto the discharge tray 46 is below the standard size (refer to S2: YES in FIG. 6), and informs the user that that the B5 sheet below the standard size has been discharged onto the discharge tray 46 by the display on the liquid crystal panel 129 or on the screen of the PC 160A, on/off light emission of each mode key 126, 127, 128, or output of the alarm sound (refer to S4 to S6 in FIG. 6). Therefore, even in case that the B5 sheet discharged onto the discharge tray 46 aligns with the inner wall on the discharge port side (on the upstream side in the transporting direction) of the body casing 3 and cannot be recognized visually from the outside of the sheet take-out port 82, the user of the multifunction device 1, can notice the existence of the B5 sheet on the discharge tray 46 without opening the image reading unit 100 due to the indication such as the display on the liquid crystal panel 129 or on the screen of the PC 160A, the on/off light emission of each mode key 126, 127, 128, or the output of the alarm sound. Accordingly, the user can take out the B5 sheet from the discharge tray 46. Therefore, according to the multifunction device 1 in this aspect, without making the structure of the discharge tray 46 and the sheet transporting structure special and complicated, by only saving the indication processing program 206 in the HDD 205 of the controller 200, the attention to the discharge tray 46 can be given to the user of the multifunction device 1 by means of the existing liquid crystal panel 129, each mode key 126, 127, 128, and the speaker 130. Accordingly, it is possible to prevent the user from forgetting to take out the B5 sheet from the discharge tray 46, and further prevent the small-sized sheet from accumulating too much on the discharge tray 46. In the multifunction device 1, the discharge tray 46 is provided between the image forming unit 2 and the image reading unit 100, and the space on the discharge tray is narrow. However, since the image reading unit 100 is the flatbed type, even the sheet discharged on the inner side of the discharge tray is easily taken out.

Further, for example, in case that a user exchanges the A4 sheet in the main sheet supply cassette 6 to an A5-sized postcard, sets the sheet size of the main sheet supply cassette 6 to A5 size, performs printing on the postcard, and immediately thereafter another user performs printing on A4 sheet, it must be informed that the postcard has been discharged onto the discharge tray 46, otherwise another user, since the user cannot notice the postcard when the user looks in the discharge tray 46, will misjudge that the A4 sheet is set in the main sheet supply cassette 6, and there is fear that the user selects the main sheet supply cassette 6 to perform printing. In this case, the print data is size-reduced and printed on the postcard, or printed as it is. Therefore, another user must perform printing again. On the other hand, as in the multifunction device 1 in this aspect, by informing another user that the postcard has been discharged onto the discharge tray 46 through the message on the liquid crystal panel 129, the on/off light emission of each mode key 126, 127, 128, or the output of the alarm sound, the user can notice that the postcard exists on the discharge tray 46, and can transmit a print command to the multifunction device 1 after confirming the sheet size in the main sheet supply cassette 6, whereby redoing of printing and wasteful use of sheet can be avoided. Therefore, this is convenient.

Further, in case that the multifunction device 1 executes the facsimile function, regardless of intention of the user of the multifunction device 1, the sheet on which the data has been already recorded is discharged onto the discharge tray 46, which is different from a case where the multifunction device 1 executes the copy function or the printer function. Therefore, for example, in case that the facsimile data has been recorded on the B5 sheet and thereafter the print data has been printed on the A4 sheet, in case that first facsimile data has been recorded on the B5 sheet and thereafter second facsimile data has been printed on the A4 sheet, or in case that the main sheet supply cassette 6 has been exchanged to the option sheet supply cassette 60 due to a shortage of the A4 sheet during recording of the facsimile data on the A4 sheet, and the remaining facsimile data has been recorded on the B5 sheet, the user takes out from the discharge tray 46 only the A4 sheet which the user can recognize visually from the sheet take-out port 82 but forgets to take out the B5 sheet which the user cannot recognize visually from sheet take-out port 82. When the next sheet is discharged onto the discharge tray 46 in a state where the B5 is left on the discharge tray, there is fear that the sheet accumulate on the discharge tray 46 too much thereby to cause bad transportation. On the other hand, according to the multifunction device 1 in this aspect, since the indication is given by the display on the liquid crystal panel 129 or on/off of the FAX mode key 127 when the received facsimile data is recorded on the B5 sheet (refer to S2: YES, S3: FAX, and S4 in FIG. 6), even in case that the B5 sheet is discharged on the discharge tray 46 regardless of the intention of the user of the multifunction device 1, the user can notice the existence of the B5 sheet and can remove the B5 sheet from the discharge tray.

Further, according to the multifunction device 1 in this aspect, when the user of the multifunction device 1 puts his hand into the machine 1 from the sheet take-out part 82 or turns the image reading unit 100 in relation to the image forming unit 2 thereby to remove the B5 sheet from the discharge tray 46, and the sheet discharge sensor 47 comes to undetect the sheet on the discharge tray 46, the indication is automatically stopped (refer to S7: YES, and S8 in FIG. 6). Therefore, it is possible to avoid such a disadvantage that the indication continues also after the B5 sheet has been removed from the discharge tray 46.

Further, according to the multifunction device 1 in this aspect, after the B5 sheet has been discharged onto the discharge tray 46, when the A4 sheet is discharged on the B5 sheet in a layer state, the indication contents are changed so that the display on the liquid crystal panel 129 is changed, on-off color or on-off interval of the mode key 126, 127, 128 is changed, or the alarm sound is changed (refer to S1 in FIG. 6). Therefore, an attention that the B5 sheet is included in the sheet discharged onto the discharge tray 46 is given to the user of the multifunction device 1, whereby it is possible to prevent the user from forgetting to take out the B5 sheet. Particularly, since the multifunction device 1 has the printer function and the copy function which form an image on the basis of the intention of the user, and the facsimile function which forms an image regardless of the intention of the user, and switches the multistage sheet supply cassette 6, 60 in case of sheet shortage thereby to form an image, the small-sized sheet below the standard size is easy to get mixed with the sheet of the standard size or more. However, the above change of the indication contents gives a strong attention to the user, whereby it is possible to prevent the small-sized sheet from accumulating too much on the discharge tray.

Further, according to the multifunction device 1 in this aspect, by performing only the visual indication such as on-off of the mode key 126, 127, 128 or the message display on the liquid crystal panel 129 (refer to S4, S5 and S6 in FIG. 6), the noise can be prevented.

(Second Aspect)

Next, a second aspect of the invention relating to the image forming apparatus will be described.

Though an image forming apparatus in this aspect is also applied to the multifunction device 1 similarly to that in the first aspect, this aspect is different from the first aspect in that indication is stopped manually, and simple control is performed without change of indication contents. Therefore, herein, a control flow in which the second aspect is different from the first aspect will be described, and the description of the common points is omitted.

Figure 7:
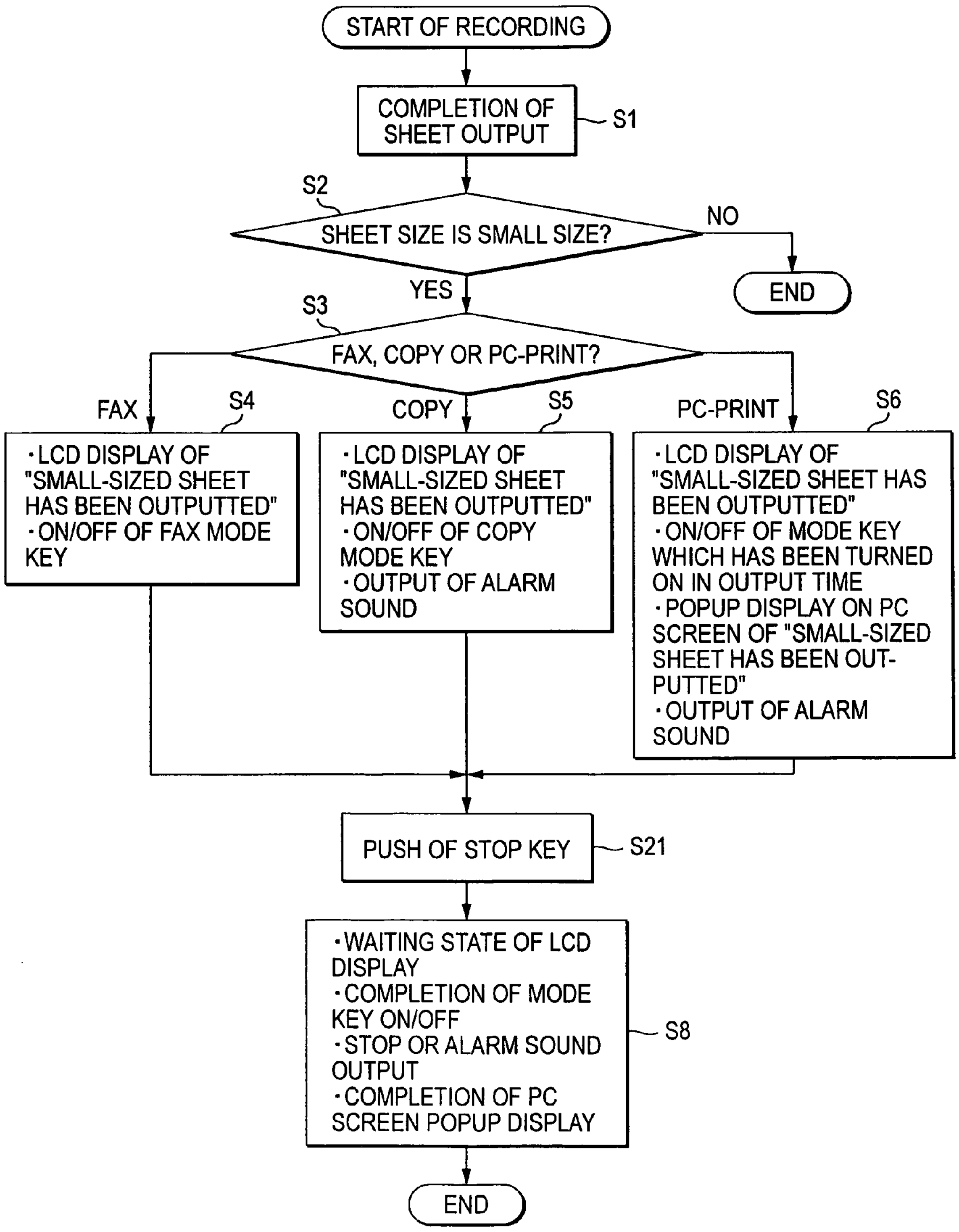
FIG. 7 is a flowchart showing indication process of a multifunction device according to a second aspect of the invention.

FIG. 7 shows a control flow by a multifunction device 1 in the second aspect.

As shown in S21 of FIG. 7, when the sheet discharged onto a discharge tray 46 is small-sized sheet, and indication is given by the predetermined indication contents (S2 to S6), till an user pushes a STOP key provided on an operational panel 21 of the multifunction device 1 in S21, the indication continues. When the user pushes the STOP key, the indication is stopped in S8, and the indication processing ends.

Accordingly, the multifunction device 1 in this aspect requires more labor on operation than the multifunction device 1 in the first aspect, because the indication must be manually stopped. However, according to the multifunction device 1 in this aspect, a sheet discharge sensor 47 is omitted, and the stop control of the indication is simplified, whereby cost can be reduced.

Though the aspects of the invention have been described, the invention is not limited to the above aspects but can be variously applied.

For example, in the above aspects, although the image forming apparatus of the invention is applied to the multifunction device 1 including the laser printer, it may be applied to an ink jet printer, or a copying machine, a facsimile device or a printer which has a single function of the copy function, the facsimile function, and the printer function.

For example, although the multifunction device 1 having the multistage sheet supply cassette has been described in the above aspects, the indication processing may be applied to an image forming apparatus which has only one a sheet supply cassette and exchanges size of sheet to be set in the sheet supply cassette to form an image. In this case, for example, when the B5 sheet below the standard size is discharged onto the discharge tray 46, its fact is informed, so that the user, when printing is performed on the A4 sheet after a while after printing has been performed on the B5 sheet, can notice by the indication from the multifunction device 1 him forgetting to reset the sheet in the sheet supply cassette to the A4 size sheet, which is convenient.

For example, in the above aspects, though the image reading unit 100 is coupled to the image forming unit 2 rotatably, and the discharge tray 46 is provided between the image reading unit 100 and the image forming unit 2, the discharge tray 46 may be provided in a body in which the image reading unit 100 and the image forming unit 2 are unitized.

For example, in the above aspects, though the indication processing is performed in each mode of the multifunction device 1, it may be performed in only the facsimile function mode. This is because the facsimile function is lower in user's attention to discharge of the recording sheet onto the discharge tray 46 than the copy function and the printer function, and higher in importance of informing the user that the small-sized recording sheet has been discharged onto the discharge tray than them.

For example, though the indication processing is executed for each job in the above aspects, it may be performed for each sheet.

For example, though the plain sheet is used as the recording sheet in the above aspects, what is different in material from the plain sheet such as an OHP, what is different in thickness such as thick sheet or thin sheet, or what is different in size such as a A5-sized postcard or sheet may be used as the recording sheet.

For example, in the above aspect, the indication contents are changed when the recording sheet (B5 sheet) below the predetermined size is discharged onto the discharge tray 46 and thereafter the recording sheet (A4 sheet) of the predetermined size or more is discharged onto the discharge tray 46. However, also in case that the recording sheet of the predetermined size or more is discharged onto the discharge tray 46 and thereafter the recording sheet below the predetermined size is discharged onto the discharge tray 46, the indication contents may be changed.

What is claimed is:

1. An image forming apparatus comprising:
- an inner discharge part which discharges a recording sheet on which an image has been formed;
- a size determining unit which determines whether a size of the recording sheet, which is discharged in the inner discharge part after the image has been formed on the recording sheet, is less than a predetermined size;
- a notification unit which indicates that the recording sheet is discharged in the inner discharge part when the size determining unit determines that the size of the recording sheet is less than the predetermined size; and
- a change unit which changes a content of the indication from the notification unit if a recording sheet having a size greater than the predetermined size and a recording sheet having a size less than the predetermined size are discharged and stacked in the inner discharge part.

2. The image forming apparatus according to claim 1, wherein the image forming apparatus is capable of receiving facsimile data and recording the facsimile data on the recording sheet, and wherein the notification unit indicates based on the determination by the size determining unit if the facsimile data is recorded on the recording sheet.

3. The image forming apparatus according to claim 1, further comprising:
- a recording sheet detecting unit which detects whether or not the discharged recording sheet exists in the inner discharge part; and
- a notification stop unit which stops the indication by the notification unit if the recording sheet detecting unit has determined that the recording sheet does not exist in the inner discharge part.

4. The image forming apparatus according to claim 1, wherein the notification unit provides a visual indication to notify that the size of the recording sheet is less than the predetermined size.

5. The image forming apparatus according to claim 1, wherein the notification unit provides an audio indication to notify that the size of the recording sheet is less than the predetermined size.

6. The image forming apparatus according to claim 1, wherein the predetermined size has a length, which is equal to a distance from a discharge port to a take-out port of the image forming apparatus.

7. An image forming apparatus comprising:
- an inner discharge part which discharges a recording sheet on which an image has been formed;
- a size determining unit which determines whether a size of the recording sheet, which is discharged in the inner discharge part after the image has been formed on the recording sheet, is less than a predetermined size;
- a notification unit which indicates that the recording sheet is discharged in the inner discharge part when the size determining unit determines that the size of the recording sheet is less than the predetermined size, and the notification unit does not indicate that the recording sheet is discharged in the inner discharge part when the size determining unit determines that the size of the recording sheet is equal to or greater than the predetermined size.

* * * * *